INVENTOR.
MILTON A. COURTRIGHT
BY
Orland M. Christensen
ATTORNEY

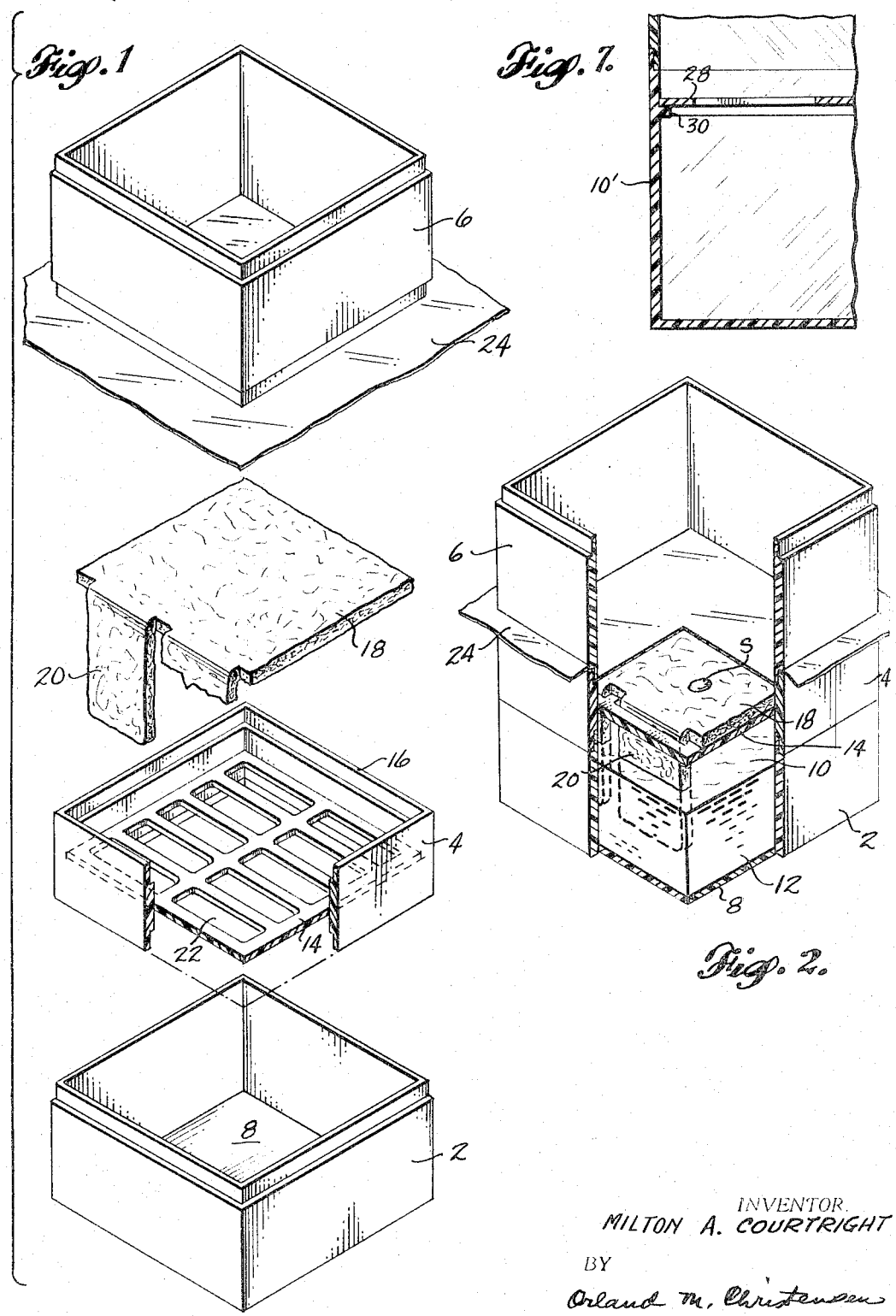

United States Patent Office 3,298,133
Patented Jan. 17, 1967

3,298,133
PLANT STARTING DEVICE
Milton A. Courtright, 19408 Des Moines Way,
Seattle, Wash. 98148
Filed July 7, 1965, Ser. No. 470,146
9 Claims. (Cl. 47—1.2)

This invention relates to plant-starting devices and particularly those which enable the plant culturist to study and observe the early stages of the plant's development before it is transplanted into the ground.

There are several classes of people who are interested in observing the various stages of development in a new plant. Nurserymen and horticulturists are interested, for example, in studying the initial stages of growth in a new strain for purposes of improving on the strain or ascertaining the optimum conditions for its growth. Other scientists are interested in plant diseases, and the home owner is interested in the growth pattern of his plants and/or the manner in which they propagate. Among these classes, each culturist may want to observe all stages of the plant's development, including the germination of the seed, the growth of the stem, the investment of new foliage on the stem, and the growth of new root structure. Preferably, he would also like a choice between soil and soilless culture, and would like to be able to readily transplant his new plant into the ground without the risk of damaging it.

It is a general object of the invention to provide a plant-starting device which is sufficiently versatile to satisfy all of these requirements. Another object is to provide such a device which is so simply and cheaply constructed as to make it readily available to all such interested parties. A still further object is to provide such a device which in no way sacrifices control of the plant's growing environment for the sake of simplicity and/or cheapness of construction. Other objects will in part be obvious and will in part appear hereinafter.

These objects are realized according to the invention by a plant-starting device of my conception which consists essentially of five distinct members that are arranged with one another so that it is possible, firstly, to observe the germination of the seed under controlled circumstances; then to convert the device into an in-soil or soilless plant growth device and to observe all aspects, if desired, of the plant's growth; and finally, to transplant the new plant into the ground without risk of damaging it. The first of the members is an open-topped container for a liquid. The next is a perforated plate which is removably supported on the container so as to extend across the interior of the same at a level in the upper section of the container below its top opening. The third is a pad or mat of moisture absorbent material which is removably supported on the plate below the opening and equipped with a capillary wick depending therefrom into the lower section of the container below the plate, for immersion in the liquid. The fourth member takes the form of a thin pliable transparent air-impermeable film which is stretched across the top opening of the container. And, the fifth member is a removable hold-down ring that is detachably engaged about the rim of the container with the film releasably clamped therebetween.

The relationship of these members and the various ways in which they cooperate to fulfill the foregoing objectives, will be better understood by reference to the accompanying drawings which show illustrative forms of the device.

In the drawings,

FIGURE 1 is an exploded view in perspective of the members as arranged in one embodiment;

FIGURE 2 is another view in perspective of the same members, as assembled in use as a germinator unit and with a part of the unit removed;

FIGURE 7 is a partial cross-section through another unit which is particularly adapted for soilless culture of the plant.

Figure 3:
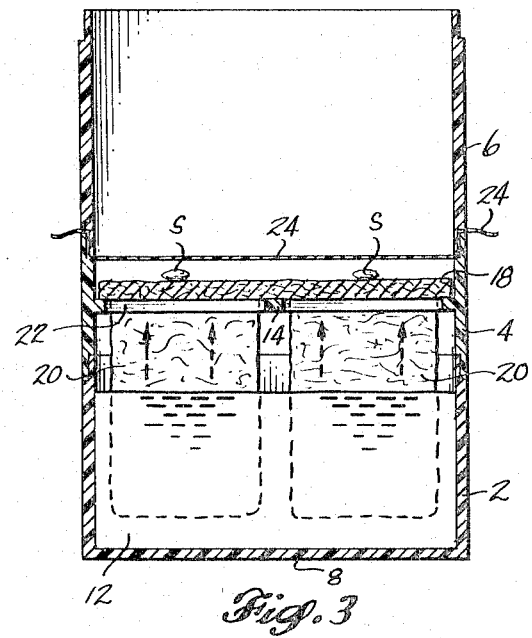
FIGURE 3 is an elevational cross-section through the operational germinator unit of FIGURE 2.

Referring firstly to the exploded view of FIGURE 1, it will be seen that the illustrated form of my device comprises a series of complementally rabbeted box frames 2, 4 and 6 which interfit with one another in the vertically tiered manner of FIGURE 2, with the lowermost of them 2 having a closed bottom 8 so that a container 10 is formed for a liquid 12. The intermediate frame 4 is formed with a slotted grate 14 that extends across its interior at a level below its upper edge or rim 16. In the assembled device, the grate serves to support a pad or mat 18 of moisture absorbent material, such as compressed peat moss, which has a pair of capillary wicks 20 depending therefrom. The wicks are sized and spaced so that they can be inserted through two of the slots 22 in the grate and immersed in the liquid below. The device also includes a thin sheet or film 24 of pliable transparent air-impermeable material, such as cellophane, which is stretched across the top opening of the intermediate frame 4 so as to close the container, and held in place by the upper frame 6 as it is engaged about the rim 16 of the intermediate frame with the film clamped therebetween. As will be explained shortly, in addition to its thus described function as a hold-down ring the upper frame 6 also performs several other valuable functions.

Referring now to FIGURE 2 in particular, it will be seen that the device is put to use as a seed germinator by first filling the lower section 2 of the container 10 with water or an appropriate solution, to a level below the grate 14 which can be reached by the depending wicks 20, and then engaging the upper section 4 over it. Afterward the pad 18 is mounted, and one or more seeds S are laid on the same to make surface contact with the moisture rising into the pad 18 through the wicks. Thereafter, to stabilize the atmosphere in the container, the film 24 is stretched over the rim 16 of the upper section and clamped into place by engaging the hold-down frame 6. As the germination of the seed progresses, it can be studied and observed through the film, either by means of the naked eye or by means of an instrument (not shown) superposed on the hold-down frame 6. If desired, all three frames 2, 4, and 6 can be made of an opaque material, such as an opaque plastic resin material, so as to darken the interior of the container 10 when the instrument is superposed on the hold-down frame. In the alternative, it may be desirable to make one or more of the frames of transparent material, such as the bottom frame, to illuminate the seed bed 18 from below or from the side. The choice will depend to a large extent on the nature of the studies and/or tests to be conducted with respect to the seeds.

Preferably, the distance between the pad 18 and the film 24 is sufficiently small to enable the culturist to get a close view of the seed. Where no instrument is used, the hold-down ring 6 will be quite thin for this purpose. Where an instrument is used, it may have considerable depth or thickness.

Figure 4:
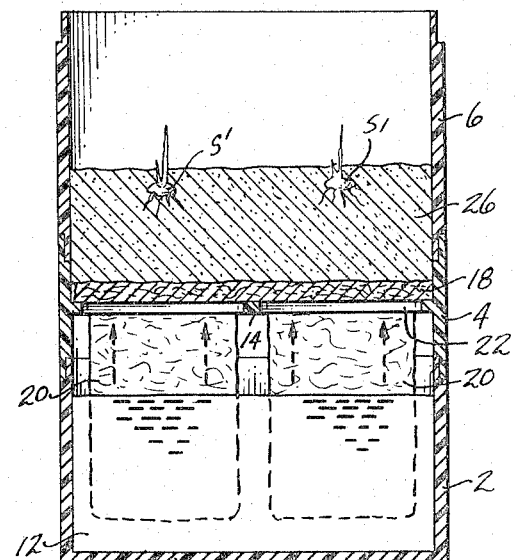
FIGURE 4 is an elevational cross-section through the unit as reassembled for use as a soil culture bed for the new plants.
Figure 5:
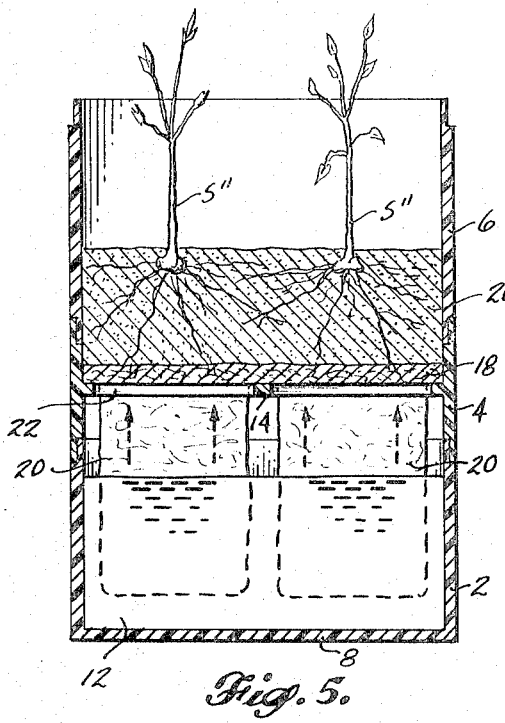
FIGURE 5 is an elevational cross-section through the unit when the new plants are ready for transplanting.

Following the seeds' germination, either soil or soilless culture of the new plant can be carried out. FIGURES 4 and 5 illustrate the former. To convert the device to this stage from the germination stage of FIGURE 3, the upper frame 6 and the film 24 are removed, the seedlings S' are carefully lifted off of the pad 18, and the upper frame is re-engaged to provide lateral support for a bed of soil or soil mix laid on the pad with the seedlings planted therein. It will be noted that the pad continues to function as a capillary medium and in addition the container 10 forms a drip pot for excess moisture added to the soil bed from above. The film 24 may or may not be reapplied, in this instance over the top opening of the frame 6 using an additional frame (not shown) to secure it. If desired, means for controlling the atmosphere above the bed, such as a system of shutters, can be installed over the frame 6.

Figure 6:
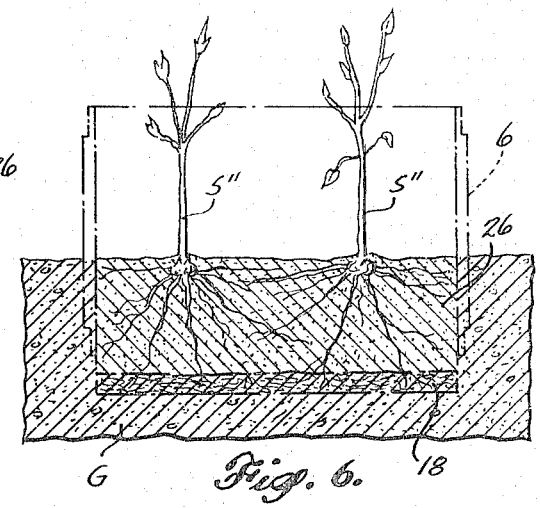
FIGURE 6 is an elevational cross-section through that portion of the unit which is transposed into the ground.

When the time arrives to transplant the new plant S" into the ground, as for example when the roots of the new plant have grown into the pad 18, the ball of earth 26, pad and frame 6 are lifted off of the container, the wicks 20 are either snapped off or flattened out into the plane of the pad, and the resulting unit (FIGURE 6) is transferred into a suitable hole in the ground G. Once in the hole, the frame 6 can be lifted away to expose the planting for backfill around it, or if the frame is made up of readily decomposable material, such as pressed cardboard, it may be retained about the planting to act as a guard and temporary water retainer for the planting as it adjusts to its new environment.

The culture can be carried out hydroponically, if desired, by using the grate 14 as a support for a mat of greater mesh, such as an excelsior mat, and allowing the plant to rest on the mat while its roots grow downwardly into a suitable liquid solution below. A film covering is desirable, if not needed in this instance, to maintain a high humidity atmosphere within the container. The addition of another hold-down frame, engaged over the first, enables the film to be stretched across the device at a level sufficiently elevated to provide room for the plant's growth. The covering is preferably minutely perforated, and in addition it is also preferred to use a highly transparent material, such as glass, in making up at least the lower of the hold-down frames.

If a highly decomposable material, such as pressed cardboard, is used in making up the intermediate frame 4, it is possible to transplant the bare-rooted seedling into the ground by separating the intermediate frame 4 from the upper and lower frames 2 and 6 and quickly transposing the entire unit to the ground in the bare root condition. However, in such an operation, I prefer to use a pressed cardboard grate 28 such as is shown in FIGURE 7, which is non-integral with the transparent container 10' and supported in the same by resting it on a shoulder 30 formed around the inside wall of the same. For ease of handling, the container 10' may be in two sections, as in the earlier embodiment, and after the upper is lifted away from the lower, one may free the grate from the same by inserting his fingers into the frame from below and lifting the grate 28 out of the member on the tips of them.

In the case of both embodiments, plant nutrients can be incorporated into the mat and/or the decomposable grate. It is also evident that the device can be reused repeatedly by substituting a new mat and/or grate after each transplanting.

As is also evident, no attempt has been made to describe all ramifications of the invention, and many modifications and additions can be made in and to the same without departing from the spirit of the invention as defined in the following claims.

I claim as my invention:

1. A plant starting device comprising an open-topped container for a liquid, a perforated plate which is removably supported on the container so as to extend across the interior of the same at a level in the upper section of the container below its top opening, a pad of moisture absorbent material which is removably supported on the plate below said opening, and which has a capillary wick depending therefrom into the lower section of the container below the plate, for immersion in the liquid, a thin, pliable transparent air-impermeable film stretched across the top opening of the container, to close the same, and a removable hold-down ring detachably engaged about the rim of the container with the film releasably clamped therebetween, said ring being open substantially across its top and bottom ends to enable the pad to be viewed through the transparent film, and of sufficient depth and open width from end to end to provide lateral support for a bed of planting earth on the pad.

2. The device according to claim 1 wherein the upper and lower sections of the container are detachable from one another and the plate is integral with the upper section.

3. The device according to claim 1 wherein the wick is inserted through a perforation in the plate.

4. The device according to claim 1 wherein the pad is of readily decomposable material.

5. The device according to claim 4 wherein the plate is also of readily decomposable material.

6. The device according to claim 1 wherein the lower and upper sections of the container and the ring take the form of vertically tiered box frames which are complementally rabbeted to interfit with one another and the lowermost of which has a closed bottom.

7. The device according to claim 1 wherein at least one of the sections is transparent.

8. A plant starting device comprising an open-topped container for a liquid, a perforated plate which is removably supported on the container so as to extend across the interior of the same at a level in the upper section of the container below its top opening, a pad of moisture absorbent material which is removably supported on the plate below said opening, and which has a capillary wick depending therefrom into the lower section of the container below the plate, for immersion in the liquid, a thin, pliable transparent air-impermeable film stretched across the top opening of the container, to close the same, and a removable hold-down ring detachably engaged about the rim of the container with the film releasably clamped therebetween, said pad and plate each being of readily decomposable material.

9. The device according to claim 1 wherein the ring is of readily decomposable material.

References Cited by the Examiner

UNITED STATES PATENTS

| | | | |
|---|---|---|---|
| 1,912,914 | 6/1933 | O'Brien | 47—38 |
| 2,249,197 | 7/1941 | Brundin | 47—38 |
| 3,112,577 | 12/1963 | Burger | 47—37 |
| 3,199,250 | 8/1965 | Sawyer | 47—38.1 |

ABRAHAM G. STONE, *Primary Examiner.*

A. E. KOPECKI, *Assistant Examiner.*